United States Patent
Shiraishi

(10) Patent No.: US 7,418,362 B2
(45) Date of Patent: *Aug. 26, 2008

(54) METHOD AND DEVICE FOR DETERMINING WHEEL FORCE

(75) Inventor: Masaki Shiraishi, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 472 days.

This patent is subject to a terminal disclaimer.

(21) Appl. No.: 10/725,459

(22) Filed: Dec. 3, 2003

(65) Prior Publication Data

US 2004/0162680 A1  Aug. 19, 2004

(30) Foreign Application Priority Data

Dec. 4, 2002 (JP) ............................. 2002-352854
May 2, 2003 (JP) ............................. 2003-127337

(51) Int. Cl.
B60C 23/06 (2006.01)

(52) U.S. Cl. ................................................. 702/146

(58) Field of Classification Search .............. 702/41, 702/42, 174, 175, 146; 73/146
See application file for complete search history.

(56) References Cited

U.S. PATENT DOCUMENTS

| | | | |
|---|---|---|---|
| 4,171,641 A * | 10/1979 | Landsness | 73/146 |
| 4,748,844 A | 6/1988 | Yoshikawa et al. | |
| 5,313,828 A | 5/1994 | Kotzle et al. | |
| 5,492,002 A * | 2/1996 | Higgins et al. | 73/1.14 |
| 5,559,437 A * | 9/1996 | Baccaud et al. | 324/240 |
| 5,894,094 A * | 4/1999 | Kuchler et al. | 73/862.044 |
| 5,895,854 A * | 4/1999 | Becherer et al. | 73/514.39 |
| 5,913,240 A * | 6/1999 | Drahne et al. | 73/146 |
| 5,938,713 A * | 8/1999 | Miyazaki | 701/71 |
| 6,038,933 A * | 3/2000 | Meyer | 73/862.045 |
| 6,122,585 A * | 9/2000 | Ono et al. | 701/71 |
| 6,263,728 B1 * | 7/2001 | Sumiya et al. | 73/146 |

(Continued)

FOREIGN PATENT DOCUMENTS

DE    44 35 160 A1    4/1996

(Continued)

OTHER PUBLICATIONS

Duane E. Otter et al.; "A Design for Next Generation Load Measuring Wheel Sets"; Proceedings of the IEEE/ASME Joint Railroad Conference; St. Louis; May 21-23, 1991; New York; pp. 37-42; XP010047397.

Primary Examiner—John E Barlow, Jr.
Assistant Examiner—Cindy H Khuu
(74) Attorney, Agent, or Firm—Birch, Stewart, Kolasch & Birch, LLP

(57) ABSTRACT

A method and device for determining force exerted on a rolling vehicle wheel. Firstly, data on a relationship between a force exerted on a vehicle wheel and a physical parameter such as strain of the radius part of the wheel at predetermined measuring positions are obtained. Using the obtained data on the relationship, a formula for the force is made. Then, the vehicle wheel is measured for the physical parameter during rolling, and using the measured physical parameter and formula, the force is calculated. The force may be a vertical force, lateral force, longitudinal force or self aligning torque. The physical parameter may be the magnitude of a radial strain.

18 Claims, 5 Drawing Sheets

U.S. PATENT DOCUMENTS

| | | | |
|---|---|---|---|
| 6,308,758 B1* | 10/2001 | Cetin et al. | 152/523 |
| 6,324,919 B1* | 12/2001 | Larsen et al. | 73/862.043 |
| 6,595,045 B1* | 7/2003 | Fuglewicz et al. | 73/129 |
| 6,651,518 B1* | 11/2003 | Miyazaki | 73/862.044 |
| 6,692,089 B2* | 2/2004 | Kuwajima et al. | 303/163 |
| 7,249,498 B2* | 7/2007 | Miyoshi et al. | 73/146 |
| 2002/0030407 A1* | 3/2002 | Nishizaki et al. | 303/146 |
| 2003/0145651 A1* | 8/2003 | Hofmann et al. | 73/146 |
| 2004/0069078 A1* | 4/2004 | Schwendemann | 73/865.9 |
| 2005/0146423 A1* | 7/2005 | Hattori | 340/438 |

FOREIGN PATENT DOCUMENTS

| | | |
|---|---|---|
| DE | 195 48 759 A1 | 6/1997 |
| DE | 100 01 272 A1 | 7/2001 |
| EP | 1 225 451 A1 | 7/2002 |

* cited by examiner

METHOD AND DEVICE FOR DETERMINING WHEEL FORCE

This Nonprovisional application claims priority under 35 U.S.C. § 119(a) on Patent Application No(s). 2002-352854 and 2003-127337 filed in Japan on Dec. 4, 2002 and May 2, 2003, respectively, the entire contents of which are hereby incorporated by reference.

BACKGROUND OF THE INVENTION

The present invention relates to a method and a device for determining wheel force exerted on a vehicle wheel during running.

In recent years, the number of vehicles equipped with computer-aided control systems such as anti-lock brake system, attitude control system (suspension control system) and steer-by-wire system is rising.

In such control systems, if data on the magnitude and direction of the wheel force exerted on a rolling vehicle wheel can be utilized, control accuracy will be dramatically improved. Hitherto, however, there is no way to get data on the wheel forces exerted on rolling vehicle wheels during running. In the car industry, therefore, there is a great demand for a device which can monitor the forces exerted on vehicle wheels during running.

SUMMARY OF THE INVENTION

It is therefore, an object of the present invention to provide a method and device by which a force exerted on a vehicle wheel during running can be easily determined.

According to one aspect of the present invention, a method for determining force exerted on a vehicle wheel comprises:

obtaining data on functionality between the force exerted on a vehicle wheel and a physical parameter of a radius part of the vehicle wheel at at least one predetermined measuring position;

making a formula of the physical parameter for the force, using the obtained data on the functionality;

measuring the physical parameter of the vehicle wheel during rolling; and computing the formula using the measured physical parameter to work out the force.

According to another aspect of the present invention, a device for determining force exerted on a vehicle wheel comprises:

at least one sensor for a physical parameter of the vehicle wheel, a memory on which data on functionality between the force and physical parameter are stored, a processor which, using data on the physical parameter read from said at least one sensor and the stored data on functionality, works out the force and outputs data on the force.

BRIEF DESCRIPTION OF THE DRAWINGS

Embodiments of the present invention will now be described in detail in conjunction with the accompanying drawings.

DETAILED DESCRIPTION OF THE PREFERRED EMBODIMENTS

The gist of the present invention is to determine at least one kind of forces exerted on a vehicle wheel by utilizing a variation of a physical parameter of the rolling vehicle wheel itself.

Figure 1:
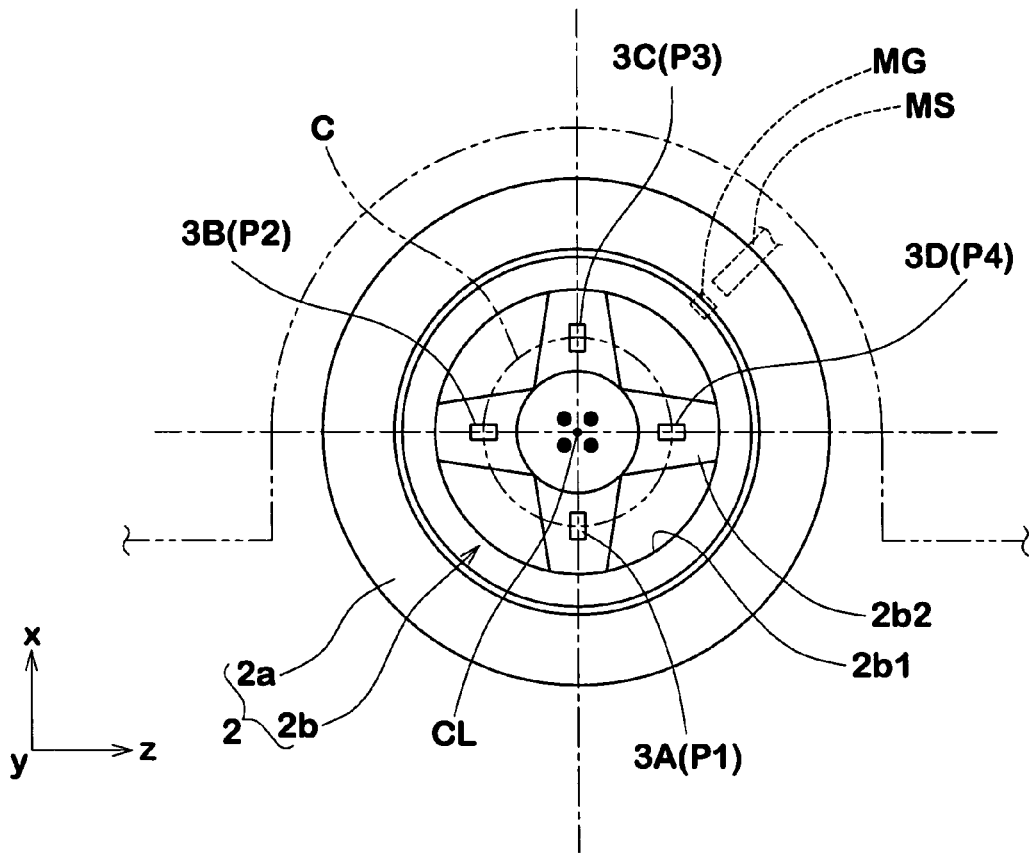
FIG. 1 is a schematic side view of a vehicle wheel.

Here, a vehicle wheel 2 comprises an radially outermost annular part 2a contacting with the road surface to cause friction against the road surface, and a radius part 2b2 extending radially outwardly from a hub attached to a vehicle axle towards the annular part 2a. In the case of an automobile, as shown in FIG. 1, a vehicle wheel 2 generally comprises a tire 2a and a wheel 2b. The tire 2a may be a pneumatic tire, a solid tire or the like. The wheel 2b comprises a rim 2b1 on which the tire is mounted and a wheel disk 2b2 between the rim and a hub attached to a vehicle axle. The wheel disk 2b2 is the above-mentioned radius part, and thus it is meant for a disk-like relatively thin part and also radius rods, spokes and the like.

As to the physical parameter, a strain is used in the following embodiment. But other parameters such as stress, magnetic property and optical property may be used too. More specifically, in the following embodiment, the strain in the radial direction measured at a position on the wheel disk 2b2 is used. But, it may be possible to use another direction and another position.

Figure 2:
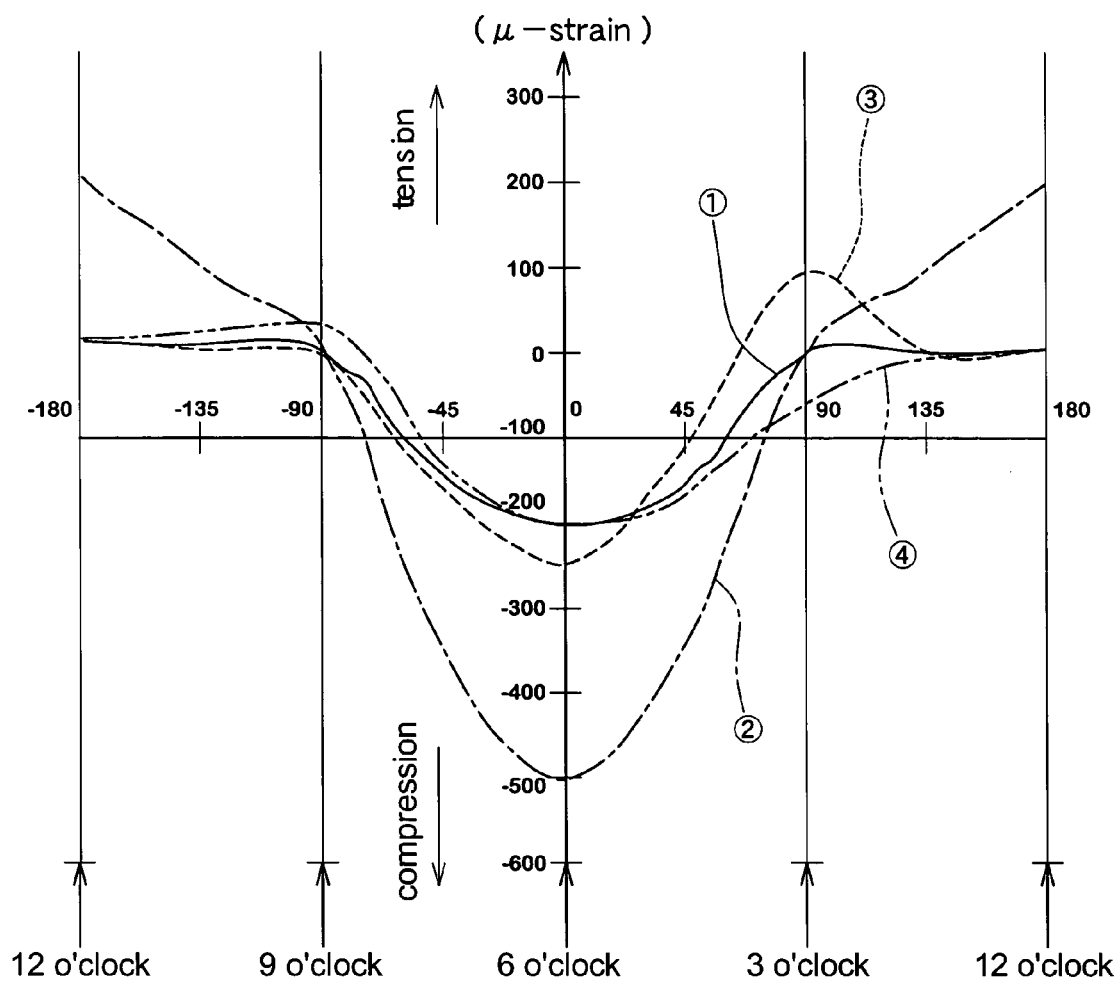
FIG. 2 is a diagram for explaining functionality or relationships between variations of strain and wheel forces exerted on a vehicle wheel.
Figure 2:
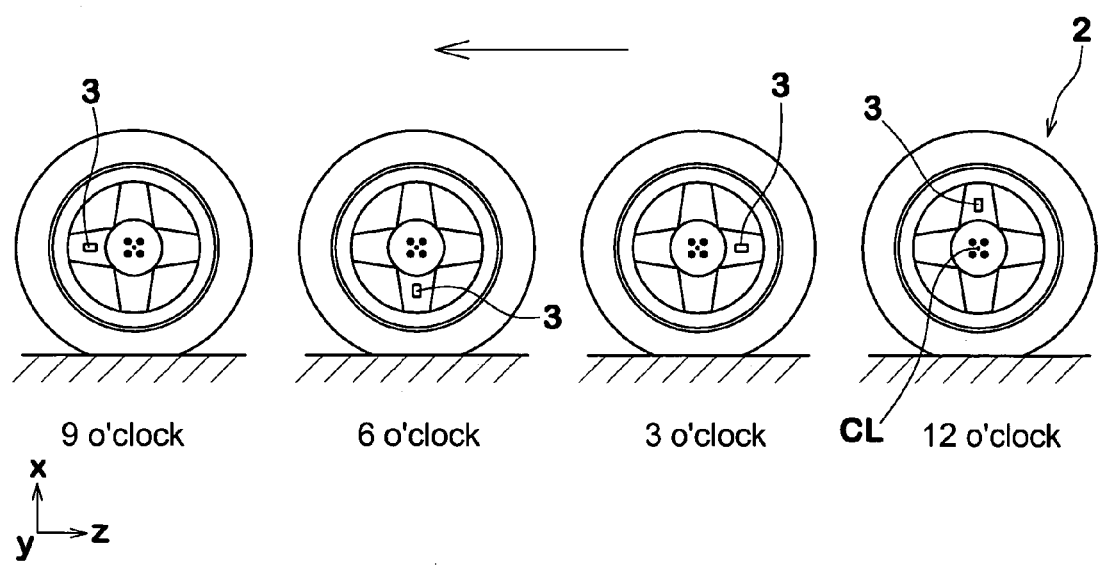

FIG. 2 shows exemplary variations of strain of a vehicle wheel which is rolling under the following conditions (1), (2), (3) and (4) where various forces F are exerted on the wheel axis CL.

| Condition | line | Wheel force F | | | |
| --- | --- | --- | --- | --- | --- |
| | | Vertical force Fx(kgf) | Lateral force Fy(kgf) | Longitudinal force (kgf) | Torque Fx(kgf · m) around x-axis |
| 1) | continuous line | 500 | 0 | 0 | 0 |
| 2) | dashed line | 500 | 400 | 0 | 0 |
| 3) | broken line | 500 | 0 | 400 | 0 |
| 4) | double-dashed line | 500 | 0 | 0 | 5 |

The strain was measured at a fixed position on the wheel disk (radius part) $2b2$ as a tensile strain (−) or compressive strain (+) in the radial direction.

The test tire used was a pneumatic radial tire of size 195/60R15 for passenger cars. The wheel was that of an aluminum alloy having a rim size of 6JJX15. The tire inflation pressure was 200 kPa.

Here, the vertical force Fx means a force in the vertical direction (x-direction). The vertical force Fx is mainly its share of the vehicle weight and the reactive force from the ground. The lateral force Fy means a force in the lateral direction (y-direction). The lateral force Fy (side force) includes a cornering force. The longitudinal force Fz means a force in the back and forth direction (z-direction). The longitudinal force Fz may include a breaking force and accelerating force. In this case, the torque Ft means a force around a vertical axis perpendicular to the wheel axis CL (or around x-axis). The torque Ft may include a self-aligning torque and steer torque. The xyz directions are referred to in the orthogonal coordinate system fixed to the wheel as shown in FIG. 3.

In each condition, typical values of the above-mentioned tire size were used for the various forces, and while applying such forces the strain was measured.

Figure 3:
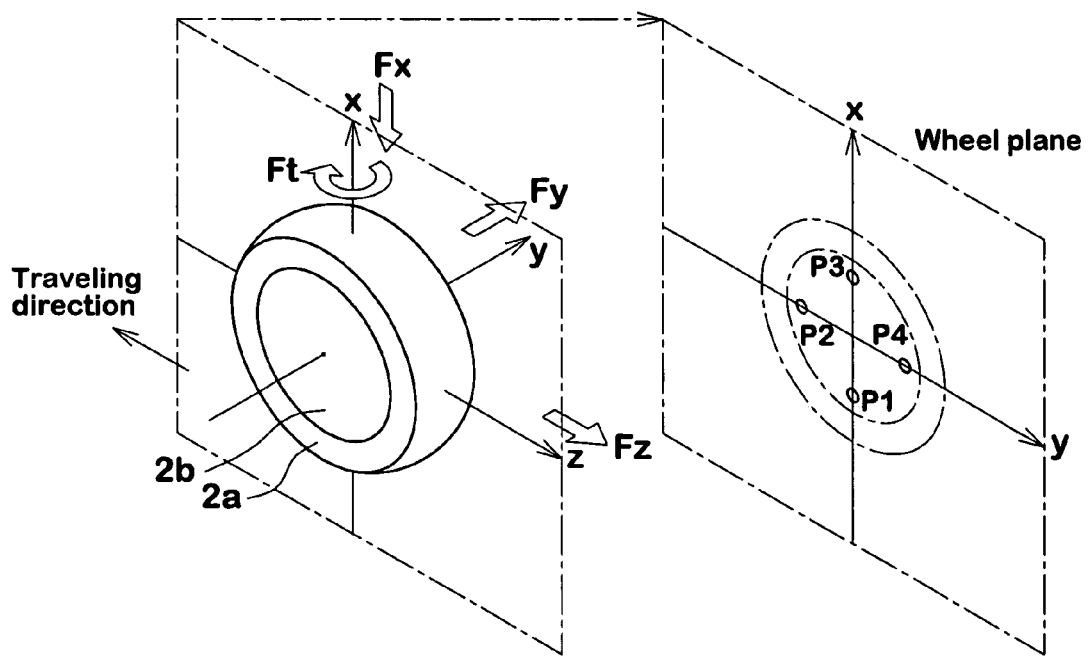
FIG. 3 is a diagram showing the physical relationship between the vehicle wheel and a xyz orthogonal coordinate system and the measuring positions P1-P4 on the wheel plane.

The expression "three-, six-, nine- and twelve-o'clock positions" means the measuring positions P1-P4 around the rotational axis CL in the wheel plane as shown in FIG. 3.

Incidentally, the unit "μ-strain" for the strain means $1 \times 10^{-6}$, namely, 0.0001%.

In every condition, the compressive strain (−) occurs and becomes maximum at the six-o'clock position P1. In particular, the strain under the condition (2) (dashed line) becomes maximum in the four conditions.

At the twelve-o'clock position P3, on the other hand, a tensile strain (+) occurs in every condition.

Under such a condition that a torque Ft is applied as the condition (4) (chain double-dashed line), the difference of the strain from that under condition (1) becomes reversed between the three-o'clock position P4 and nine-o'clock position P3. More, specifically, at the three-o'clock position P4 (rear in the traveling direction), the stress inclines towards the tension side although it inclines towards the compression side at the nine-o'clock position P2 (front in the traveling direction).

Under such a condition that a longitudinal force Fz is applied, at either the three-o'clock position P4 or nine-o'clock position P2, the strain shows a maximum towards the tensile side whereas it does not show any maximum at the other position. For example, when a large braking force is exerted, the strain largely inclines towards the tensile side at the three-o'clock position as shown in FIG. 2.

As explained above, the strain s varies depending on both the measuring position P and combination of various forces F exerted on the vehicle wheel 2. The strain S occurring on a wheel has sensibilities to the respective wheel forces F and the sensibilities vary depending on the measuring position P, and the variations (curves in FIG. 2) are generally different from each other as explained above.

When wheel forces F such as vertical force Fx, lateral force Fy, longitudinal force Fz and torque Ft are exerted on the vehicle wheel at the same time, the strain s at a certain position on the wheel disk is the summation of the strains caused by the respective wheel forces.

Thus, using the physical parameters (radial strains) measured at the predetermined specific positions P, the wheel forces can be obtained by solving simultaneous equations prepared in advance through measurements of the parameters at the above-mentioned predetermined positions P.

Taking the above-mentioned example where the physical parameters are radial strains and the predetermined specific positions are the six-o'clock, nine-o'clock, twelve-o'clock and three-o'clock positions P1-P4, a method of making the simultaneous equations is explained below.

As the strain s at any position P is a function of the wheel forces F, the strain "Sa" at the six-o'clock position P1, the strain "Sb" at the twelve-o'clock position P3, the strain "Sc" at the three-o'clock position P4 and the strain "Sd" at the nine-o'clock position P2 can be expressed as follows:

$$Sa(Fx,Fy,Fz,Ft) = A1 \times Fx + A2 \times Fy + A3 \times Fz + A4 \times Ft$$

$$Sb(Fx,Fy,Fz,Ft) = B1 \times Fx + B2 \times Fy + B3 \times Fz + B4 \times Ft$$

$$Sc(Fx,Fy,Fz,Ft) = C1 \times Fx + C2 \times Fy + C3 \times Fz + C4 \times Ft$$

$$Sd(Fx,Fy,Fz,Ft) = D1 \times Fx + D2 \times Fy + D3 \times Fz + D4 \times Ft$$

wherein

A1-A4, B1-B4, C1-C4 and D1-D4 are coefficients corresponding to the above-mentioned sensibilities of the strain to the respective wheel forces (Fx, Fy, Fz, Ft) at the respective position P. Incidentally, the sensibility is the ratio of the variation of the strain to the variation of the force.

Thus, the wheel force F can be obtained by computing equations, for example the following determinant.

$$\begin{bmatrix} Fx \\ Fy \\ Fz \\ Ft \end{bmatrix} = \begin{bmatrix} A1 & A2 & A3 & A4 \\ B1 & B2 & B3 & B4 \\ C1 & C2 & C3 & C4 \\ D1 & D2 & D3 & D4 \end{bmatrix}^{-1} \begin{bmatrix} Sa(Fx, Fy, Fz, Ft) \\ Sb(Fx, Fy, Fz, Ft) \\ Sc(Fx, Fy, Fz, Ft) \\ Sd(Fx, Fy, Fz, Ft) \end{bmatrix}$$

The above-mentioned coefficients A1-A4, B1-B4, C1-C4 and D1-D4 can be found as follows:

$$A1 = \{Sa(500, 0, 0, 0) - Sa(0, 0, 0, 0)\}/500$$

$$A2 = \{Sa(500, 400, 0, 0) - Sa(500, 0, 0, 0)\}/400$$

$$A3 = \{Sa(500, 0, 400, 0) - Sa(500, 0, 0, 0)\}/400$$

$$A4 = \{Sa(500, 0, 0, 5) - Sa(500, 0, 0, 0)\}/5$$

$$B1 = \{Sb(500, 0, 0, 0) - Sb(0, 0, 0, 0)\}/500$$

$$B2 = \{Sb(500, 400, 0, 0) - sb(500, 0, 0, 0)\}/400$$

$$B3 = \{Sb(500, 0, 400, 0) - Sb(500, 0, 0, 0)\}/400$$

$$B4 = \{Ss(500, 0, 0, 5) - Sb(500, 0, 0, 0)\}/5$$

$$C1 = \{Sc(500, 0, 0, 0) - Sc(0, 0, 0, 0)\}/500$$

$$C2 = \{Sc(500, 400, 0, 0) - Sc(500, 0, 0, 0)\}/400$$

$$C3 = \{Sc(500, 0, 400, 0) - Sc(500, 0, 0, 0)\}/400$$

$$C4 = \{Sc(500, 0, 0, 5) - Sc(500, 0, 0, 0)\}/5$$

$$D1 = \{Sd(500, 0, 0, 0) - Sd(0, 0, 0, 0)\}/500$$

$$D2 = \{Sd(500, 400, 0, 0) - Sd(500, 0, 0, 0)\}/400$$

$$D3 = \{Sd(500, 0, 400, 0) - Sd(500, 0, 0, 0)\}/400$$

$$D4 = \{Sd(500, 0, 0, 5) - Sd(500, 0, 0, 0)\}/5$$

For details, as to a group of the first four equations relating to the six-o'clock position P1: without applying any wheel force F, the strain Sa(0, 0, 0, 0) is measured. And by applying vertical force Fx of 500 kgf only, the strain Sa(500, 0, 0, 0) is measured. Further, by applying lateral force Fy of 400 kgf together with vertical force Fx of 500 kgf, the strain Sa(500, 400, 0, 0) is measured. Furthermore, by applying vertical force Fx of 500 kgf and torque Ft of 5 kgf·m, the strain Sa(500, 0, 0, 5) is measured. Then, by making the above calculation, the coefficients A1-A4 are obtained.

As to the remaining three groups, in the same way as above excepting the measuring positions P, the strains are measured and by making the calculation, the coefficients B1-B4, C1-C4 and D1-D4 can be obtained.

In the above-mentioned embodiment, in order to obtain four kinds of wheel forces, four measuring positions P1-P4 are necessitated. As understood from the above description, at least the same number of measuring positions as the number of the wheel forces are necessitated. Therefore, if only one kind of force, for example, the longitudinal force is required to control the undermentioned brake system BS, the number of the measuring position may be reduced to only one (three-o'clock position), but in order to promote accuracy, two or more positions are desired.

In order to measure the physical parameters, various detectors or sensors of mechanical type, semiconductor type etc. may be used. In this example, in view of the stability against temperature variation, a strain gauge of wire resistance type is used. But it is of course possible to use another type of sensor depending on the kind of the parameter and the environment.

As known from the above description, the device for determining the wheel force according to the present invention must be able to determine the physical parameters (strain S) of the rolling wheel 2b while the vehicle is traveling.

Figure 4:
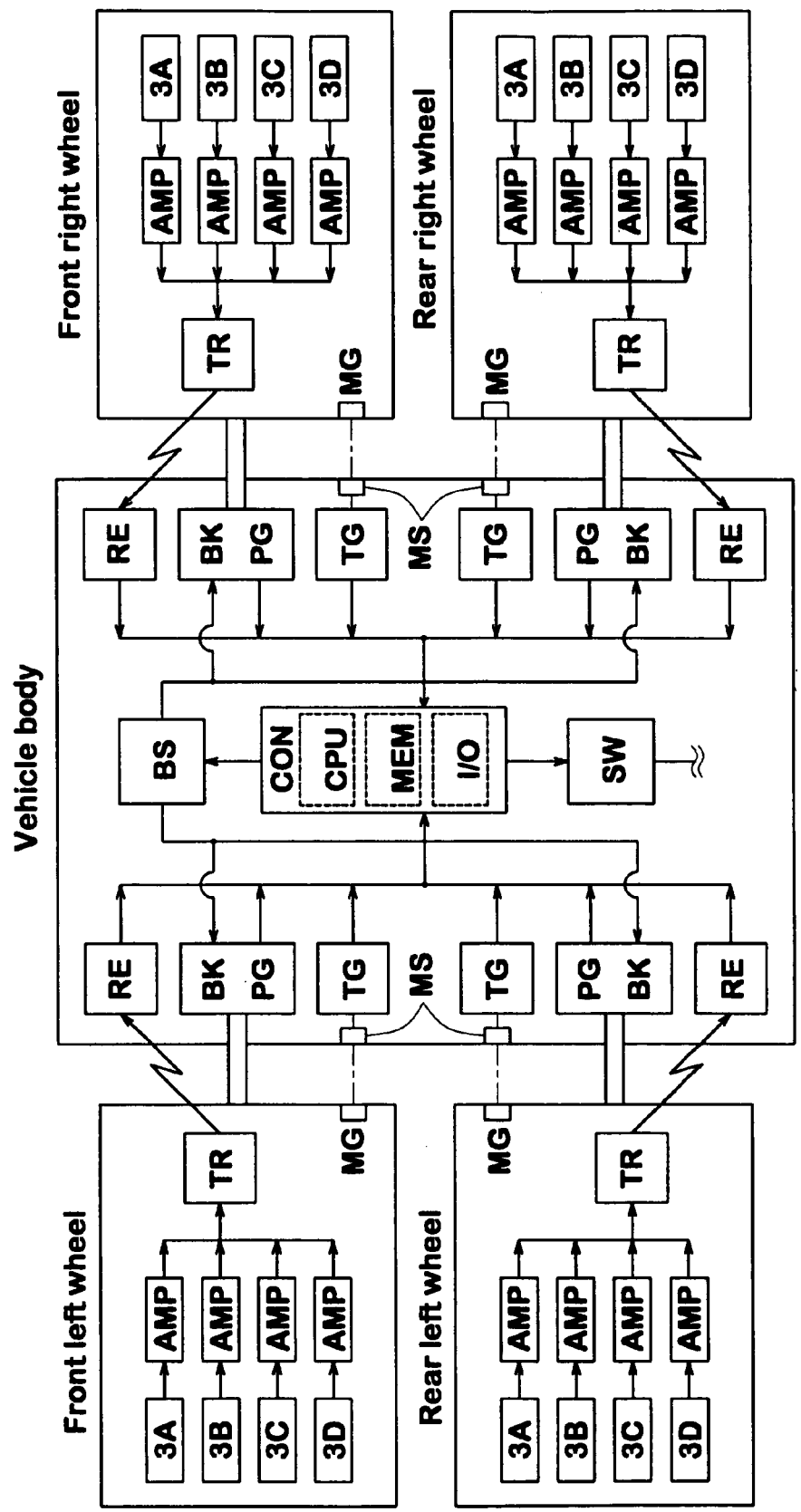
FIG. 4 is a diagram showing a system of determining wheel force according to the present invention.

FIG. 4 is a block diagram showing an example of the device which can output electronic data on all of the above-mentioned wheel forces on each wheel of a four-wheeled vehicle in order to, for example, provide: data on the longitudinal force Fz, especially, breaking force for the undermentioned brake system BS; data on the torque Ft for a steering system such as a steer-by-wire system SW which requires feedback when the driver turns the steering wheel; and data on the vertical force Fx and lateral force Fy for a suspension control system and attitude control system.

In this example, four strain gauge sensors 3A, 3B, 3C and 3D are provided on the wheel disk 2b2 every 90 degrees around the rotational axis CL of the wheel 2b under the same conditions, e.g. at the same distance C from the rotational axis as shown in FIG. 1. This is because the strain s can be measured at four positions P1-P4 without time lag. But, in case of a system which permits a slight time lag, the use of less sensors or only one sensor 3 may be possible because the sensor 3 can measure the force F at every position P while moving around the rotational axis CL.

In this example, since the sensors 3 are fixed to the wheel disk 2b2, the sensors are rotated together with the wheel. Therefore, to transmit the measured data, a wireless transmission system is employed between the vehicle wheels 2 and the vehicle body, which comprises a transmitter TR on each wheel 2b and a receiver RE disposed on the vehicle body. The transmission system may utilize radio waves, lightwaves or electromagnetic induction.

As to the positions to which the sensor are fixed, in case of a combination of a tire and a wheel, the rim 2b1 is not preferable because the strain is liable to vary widely by other factors than wheel force, for example, tire inflation pressure, road surface conditions, tire engaging force and the like, and it is very difficult to discriminate the wheel forces. In contrast to the rim, the wheel disk 2b2 is generally easy to discriminate the wheel forces as explained above, but, in order to minimize the adverse effects of the relatively large rim deformation, a position in the direction of the hub or in the middle is generally preferred rather than the near rim position on the radius part 2b2.

Since the sensors 3 are moved while the wheel is rotating, it is necessary to locate the sensors 3 with a sensor-locating device TG.

Figure 6:
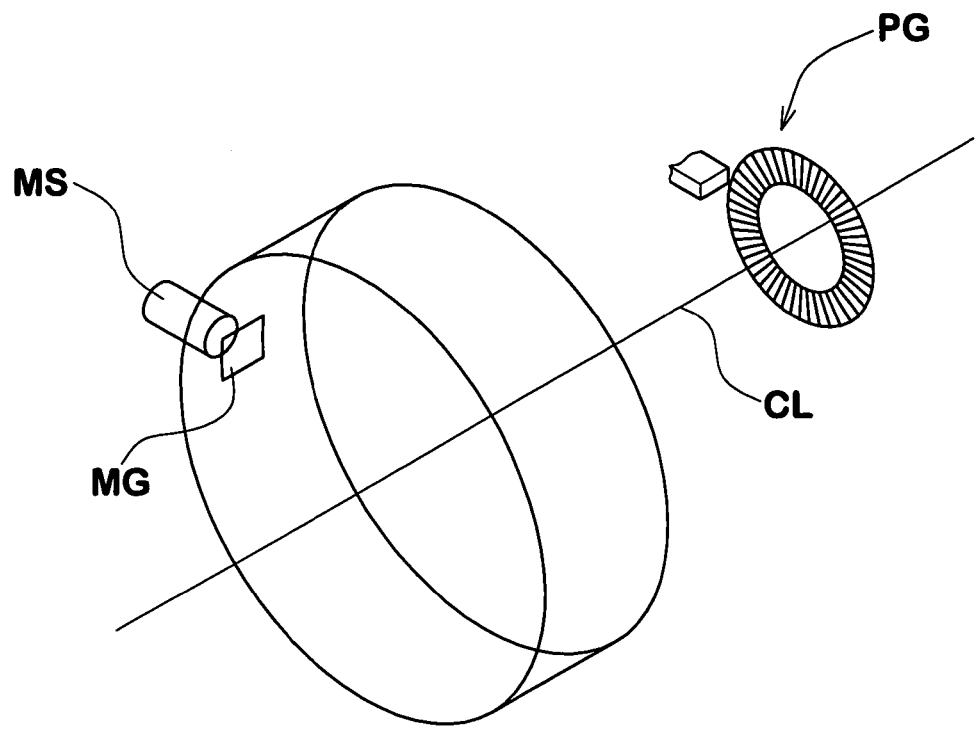
FIGS. 6 and 7 each shows an example of the arrangement of sensors for locating the sensors.

FIG. 6 shows an example of the detector part of the sensor-locating device TG. In this example, the detector part comprises a magnetic material MG fixed to each wheel, a magnetic sensor MS provided on the vehicle body, and a pulse generator PG. The magnetic material MG and magnetic sensor MS constitute a part of a trigger device.

The trigger device outputs a trigger signal when the magnetic material MG gets near to the magnetic sensor MS. In this example, the magnetic material MG is one piece of magnet, and the trigger signal is outputted once per one revolution of the wheel.

The pulse generator PG outputs a pulse every predetermined rotational angle of the wheel. In this embodiment, the pulse generator PG is a combination of a rotor provided with teeth at even intervals and disposed on the vehicle axle to rotate together with the vehicle wheel, and a generator outputting one pulse corresponding to each tooth detected.

If the pulse number per one revolution is for example 48 pulses, when 12 pulses are counted, starting with a trigger signal, the wheel has rotated 90 degrees.

Although another arrangement is possible, in this example, for the sake of simple explanation, the magnetic sensor MS and magnetic material MG are arranged such that, when the sensors 3A-3D are at the measuring positions P, namely, the above-mentioned three, six, nine and twelve-o'clock positions P1-P4, a trigger signal is generated.

More specifically, at the time the trigger signal is generated, the sensor 3A is at the six-o'clock position P1, the sensor 3B is at the nine-o'clock position P2, the sensor 3C is at the twelve-o'clock position P3 and the sensor 3D is at the three-o'clock position P4 as shown in FIG. 1. Accordingly, when 12 pulses are counted, 3A is at P2, 3B at P3, 3C at P4 and 3D at P1. When 24 pulses are counted, 3A is at P3, 3B at P4, 3C at P1 and 3D at P2. When 36 pulses are counted, 3A is at P4, 3B at P1, 3C at P2 and 3D at P3. When 48 pulses are counted, the wheel made one revolution, and 3A is returns to P1, 3B to P2, 3C to P3 and 3D to P4. Therefore, the angle of rotation of the wheel from a reference position (namely, trigger signal generating position) is known from the count number, and the sensors can be easily located.

Aside from the above-mentioned combination of one magnetic sensor MS and one magnetic material MG per a wheel, a combination of the single magnetic material MS and a plurality of magnetic sensors MS disposed on the vehicle body is also possible. In this case, using the sensors MS of the same number as that of the measuring positions P or more, the sensors 3 can be easily located without counting the pulses thus without using the pulse generator and counter.

The analog output of the sensor 3 is usually very small. Therefore, a linear amplifier AMP is used. However, if the sensor output is nonlinear, a nonlinear or equalizer amplifier AMP is preferably used. If necessary, an analog to digital converter may be included in the amplifier AMP.

The outputs from the amplifiers AMP of the respective sensors 3A-3D are encoded/modulated and send out by the transmitter TR.

The transmitted signal is received and decoded/demodulated by the receiver RE, and outputted towards the controller CON comprising a CPU, memory, I/O device and the like.

The amplifier AMP and transmitter TR is fixed to the wheel, but it may be also possible to fix to another part as far as the part rotates together with the wheel such as a braking mechanism or near part.

In case of the construction shown in FIG. 4 and the above-mentioned magnetic material MG and sensor MS arrangement, the following processes are carried out by the controller CON with respect to each wheel if the traveling direction is forward. If reverse, similar processes or other processes may be carried out. Incidentally, the controller CON can get the data on the traveling direction from a switch connected with the transmission selector or the like.

Figure 5:
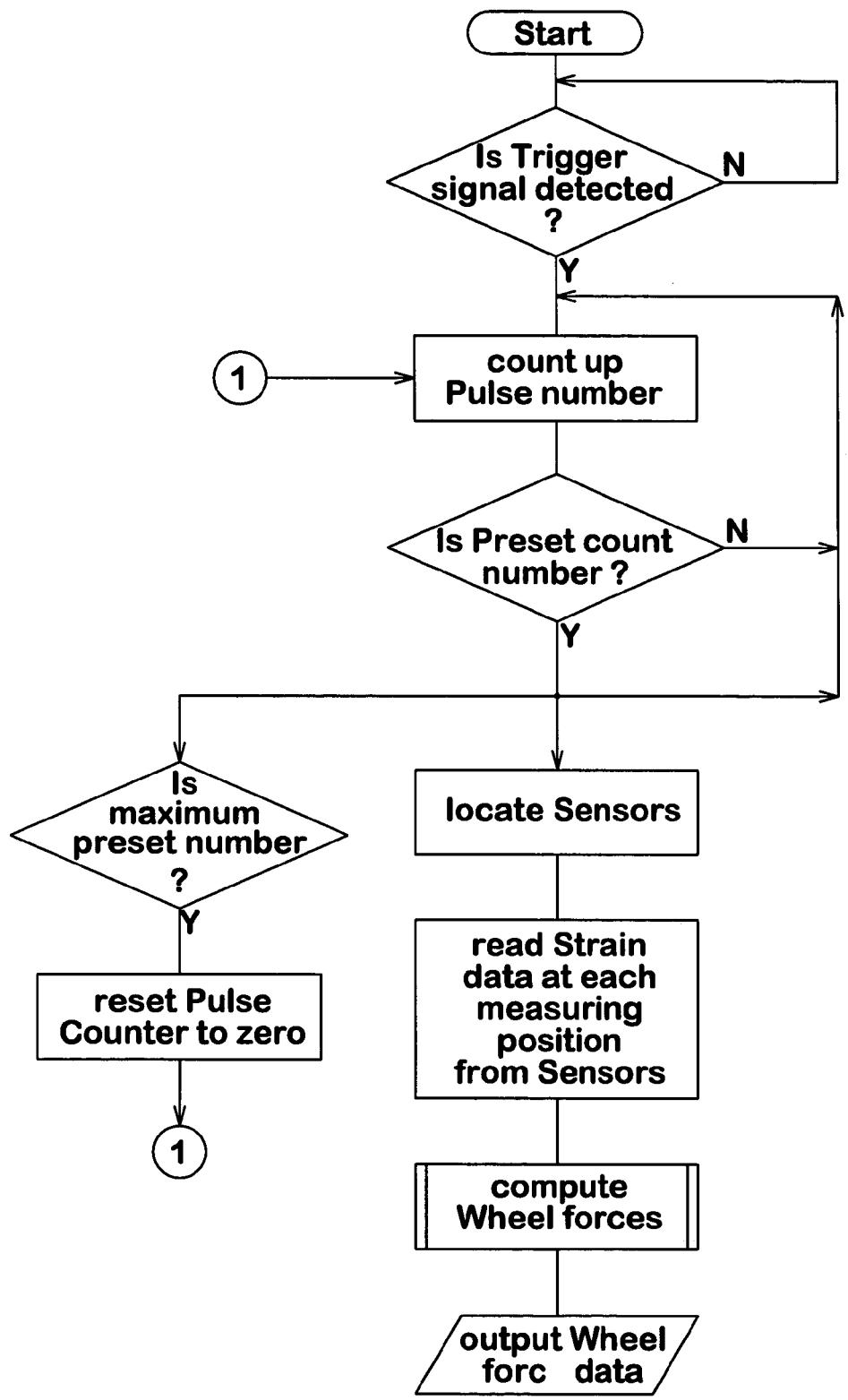
FIG. 5 is a flowchart for determining wheel forces on each wheel in the system shown in FIG. 4.

When the ignition switch of the vehicle is turned to ON and power is applied to the controller CON etc., as shown in FIG. 5, the controller CON: waits for a trigger signal; if a trigger signal is detected, starts to count pulses; and the same time, checks if the count number reaches to the preset numbers (in this example, 12, 24, 36 and 48); if not, continues to count the pulses; if the count number is one of the preset numbers, locates the sensors by using the count number as explained above; and at the same time, checks if the count number is the maximum preset number (48), if so, resets the pulse counter to zero; after the sensors are located, fetches data on the strain at each measuring position from the sensor through the transmission system; and then computes the wheel forces by using the strain data and information such as the above-mentioned equations or determinant which has been acquired from the measurement of the wheel in advance and stored on the memory; and outputs electronic data of the required wheel force (in this example, all of the above-mentioned vertical force Fx, lateral force Fy, longitudinal force Fz and torque Ft) toward the computer-aided control systems BS, SW.

The existing anti lock brake system monitors the rotation of the wheel during braking, and controls the braking mechanism not to lock the wheel by reducing the force restraining the rotation of the wheel if wheel lock is detected. Thus, during locked, as the tire goes into a skid where the friction coefficient is very small, even if the locked time is very short, the frictional force becomes considerably decreased.

In the brake system BS according to the present invention, a controller monitors the longitudinal force Fz (breaking force) during braking, and controls the braking mechanism BK so that the breaking force (frictional force) becomes maximum by reducing or increasing the force restraining the rotation of the wheel. Thus, the breaking distance becomes always minimized.

In the steer-by-wire system SW according to the present invention, a reactive force corresponding to or proportional to the torque Ft (self-aligning torque) is applied to the steering wheel of the vehicle as feedback by using a torque generator such as electric motor. Therefore, the driver's feel is remarkably improved.

Figure 7:
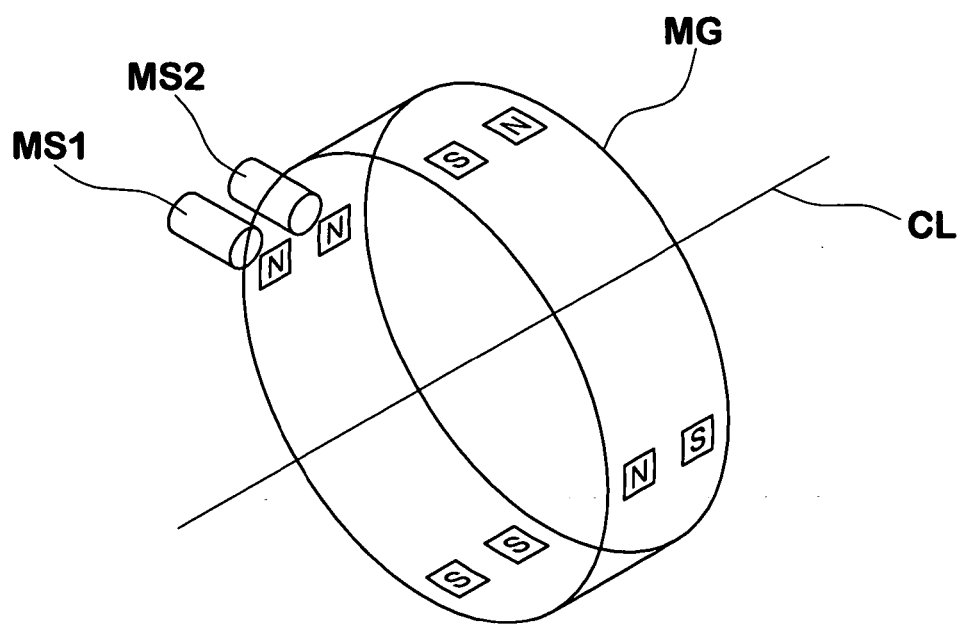

FIG. 7 shows another example of the detector part of the sensor-locating device TG which can locate the sensors 3 without counting the pulses from the pulse generator PG. In this example, the detector part comprises the magnetic material MS made up of a plurality of magnets, and a plurality of magnetic sensors MS1 and MS2. The magnets are grouped such that each group has a unique arrangement of the north pole (N) and south pole (S) so as to be able to identify the group by detecting the NS pole arrangement. The following is an example of the NS pole arrangement in case the group number is four and the pole number in each group is two

| Group (Position) | NS pole arrangement |
| --- | --- |
| 1 | N + N |
| 2 | S + N |
| 3 | N + S |
| 4 | S + S |

In this method, by increasing the number of NS poles in each group and the number of groups, the angularly resolution can be easily improved. Of course this concept can be applied to not only magnetism but also other physical properties as far as sensible by appropriate sensing devices.

The electric power for the transmitter TR, amplifiers AMP, sensors 3 and so forth provided on the vehicle wheel may be supplied through a wireless system utilizing, for example, electromagnetic induction. But, in this example, the electric power is supplied through a power transmission unit utilizing physical contact between electric conductors such as slip ring unit. In this case, it is possible to use the physical contact type power transmission unit in order to send the sensor data from the wheels to the vehicle body. More specifically, the transmitter TR generates a carrier wave modulated by the sensor data and superposes the modulated carrier wave on the DC power. The modulated carrier wave is split off from the DC power and demodulated into the sensor data by the receiver RE.

The invention claimed is:

1. A method for determining force exerted on a vehicle wheel, the vehicle wheel comprising a radius part between a hub and a radially outermost annular ground contacting part, the method comprising the steps of:

obtaining data on a relationship between the force exerted on the vehicle wheel and a physical parameter of the vehicle wheel at at least one predetermined measuring position;

deriving a formula that calculates the physical parameter in terms of the magnitude of the force exerted on the vehicle wheel, using the obtained data on the relationship;

measuring the physical parameter of the vehicle wheel during rolling;

computing the formula using the measured physical parameter to calculate the force; and outputting the calculated force;

wherein
the physical parameter is the magnitude of a radial strain in the radius part.

2. The method according to claim 1, wherein the force is at least one of a vertical force, a lateral force, a longitudinal force and a torque.

3. A method for determining force exerted on a vehicle wheel, the vehicle wheel comprising a radius part between a hub and a radially outermost annular ground contacting part, the method comprising the steps of:
obtaining data on a relationship between the force exerted on the vehicle wheel and a physical parameter of the vehicle wheel at at least one predetermined measuring position;
deriving a formula of the physical parameter for the magnitude of the force, using the obtained data on the relationship;
measuring the physical parameter of the vehicle wheel during rolling; computing the formula using the measured physical parameter to calculate force; and
outputting the calculated force,
wherein
the measuring of the physical parameter includes:
locating a sensor for the physical parameter which is fixed to the radius part; and
reading the sensor when the sensor is at said at least one predetermined measuring position.

4. A method for determining force exerted on a vehicle wheel, the vehicle wheel comprising a radius part between a hub and a radially outermost annular ground contacting part, the method comprising the steps of:
obtaining data on a relationship between the force exerted on the vehicle wheel and a physical parameter of the vehicle wheel at at least one predetermined measuring position;
deriving a formula of the physical parameter for the magnitude of the force, using the obtained data on the relationship;
measuring the physical parameter of the vehicle wheel during rolling;
computing the formula using the measured physical parameter to calculate force; and
outputting the calculated force,
wherein
said at least one predetermined measuring position is a plurality of predetermined measuring positions, and
the measuring of the physical parameter includes:
locating a plurality of sensors for the physical parameter which are fixed to the radius part; and
reading each said sensor when the sensor is at at least one of the predetermined measuring positions.

5. A method for determining force exerted on a vehicle wheel, the vehicle wheel comprising a radius part between a hub and a radially outermost annular ground contacting part, the method comprising the steps of:
obtaining data on a relationship between the force exerted on the vehicle wheel and a physical parameter of the vehicle wheel at at least one predetermined measuring position;
deriving a formula of the physical parameter for the magnitude of the force, using the obtained data on the relationship;
measuring the physical parameter of the vehicle wheel during rolling;
computing the formula using the measured physical parameter to calculate force; and
outputting the calculated force,
wherein
said at least one predetermined measuring position is a plurality of predetermined measuring positions, and
the measuring of the physical parameter includes:
locating a plurality of sensors for the physical parameter which are fixed to the radius part; and
reading each said sensor when the sensor is at each of the predetermined measuring positions.

6. The method according to claim 1 or 3 or 4 or 5, wherein
the radially outermost annular ground contacting part is a tire, and the radius part is a wheel disk of a wheel on which the tire is mounted.

7. The method according to claim 1 or 4 or 5, wherein
said at least one predetermined measuring position is a twelve-o'clock position (P3), three-o'clock position (P4), six-o'clock position (P1) and nine-o'clock position (P2) which are arranged at every 90 degrees around the rotational axis of the vehicle wheel.

8. The method of claim 3 or 4 or 5, wherein said physical parameter is the magnitude of radial strain on the radius part of the vehicle wheel.

9. The method of claim 3, wherein
the force is at least one of a vertical force, a lateral force, a longitudinal force and a torque, wherein the vertical force, lateral force and longitudinal force are forces in x-direction, y-direction and z-direction, respectively, of an xyz orthogonal coordinate system fixed to a wheel plane, and the torque is a force around the x-axis of the xyz orthogonal coordinate system.

10. The method of claim 4, wherein
the force is at least one of a vertical force, a lateral force, a longitudinal force and a torque, wherein the vertical force, lateral force and longitudinal force are forces in x-direction, y-direction and z-direction, respectively, of an xyz orthogonal coordinate system fixed to a wheel plane, and the torque is a force around the x-axis of the xyz of the xyz orthogonal coordinate system.

11. The method of claim 5, wherein
the force is at least one of a vertical force, a lateral force, a longitudinal force and a torque, wherein the vertical force, lateral force and longitudinal force are forces in x-direction, y-direction and z-direction, respectively, of an xyz orthogonal coordinate system fixed to a wheel plane, and the torque is a force around the x-axis of the xyz orthogonal coordinate system.

12. A device for determining force exerted on a vehicle wheel including a radially outermost annular ground contacting part, a hub and a radius part therebetween, the device comprising:
at least one sensor for measuring a physical parameter of the vehicle wheel during rolling, said at least one sensor being attached to the radius part;
a memory in which a formula that calculates the physical parameter in terms of the force exerted on the vehicle wheel at at least one predetermined measuring position is stored;
a device for locating said at least one sensor in order to measure the physical parameter when the sensor is at the predetermined measuring position; and
a processor which, using data on the physical parameter read from said at least one sensor, computes the formula to calculate the force and output data on the force.

13. The device according to claim 12, wherein
said physical parameter is the magnitude of radial strain on the radius part of the vehicle wheel.

14. The device according to claim 12, wherein said at least one sensor is a single sensor fixed to the radius part of the vehicle wheel.

15. The device according to claim 12, wherein
said at least one sensor is a plurality of sensors arranged around the rotational axis of the vehicle wheel and fixed to the radius part of the vehicle wheel.

16. The device according to claim 12, wherein said force is at least one of a vertical force, a lateral force, a longitudinal force and a self-aligning torque.

17. A brake system including:
the device according to claim 12 to determine a breaking force during braking,
a braking mechanism for the vehicle wheel; and
a controller for controlling the braking mechanism so that the breaking force becomes a maximum during braking.

18. The method of claim 12, wherein
the force is at least one of a vertical force, a lateral force, a longitudinal force and a torque, wherein the vertical force, lateral force and longitudinal force are forces in x-direction, y-direction and z-direction, respectively, of an xyz orthogonal coordinate system fixed to a wheel plane, and the torque is a force around the x-axis of the xyz orthogonal coordinate system.

* * * * *